United States Patent [19]

Takahashi

[11] Patent Number: 5,590,220

[45] Date of Patent: Dec. 31, 1996

[54] BENDING POINT EXTRACTION METHOD FOR OPTICAL CHARACTER RECOGNITION SYSTEM

[75] Inventor: Hiroyasu Takahashi, San Jose, Calif.

[73] Assignee: International Business Machines Corporation, Armonk, N.Y.

[21] Appl. No.: 928,818

[22] Filed: Aug. 12, 1992

[51] Int. Cl.⁶ ........................... G06K 9/46
[52] U.S. Cl. ........................ 382/203; 382/199
[58] Field of Search ............... 382/25, 26, 22, 382/21, 199, 200, 201, 203, 204, 159, 190

[56] References Cited

U.S. PATENT DOCUMENTS

| | | | |
|---|---|---|---|
| 4,208,651 | 6/1980 | McMahon | 382/21 |
| 4,361,830 | 11/1982 | Honma et al. | 340/146.3 |
| 4,513,444 | 4/1985 | Okai et al. | 382/56 |
| 4,542,412 | 9/1985 | Fuse et al. | 358/260 |
| 4,628,532 | 12/1986 | Stone et al. | 382/21 |
| 4,644,583 | 2/1987 | Watanabe et al. | 382/22 |
| 4,771,469 | 9/1988 | Wittenburg | 382/25 |
| 4,771,474 | 9/1988 | Takashima et al. | 382/56 |
| 4,773,098 | 9/1988 | Scott | 382/21 |
| 4,910,786 | 3/1990 | Eichel | 382/22 |
| 4,975,853 | 12/1990 | Shimizu et al. | 364/474.24 |
| 5,091,976 | 2/1992 | Murayama | 382/22 |
| 5,159,645 | 10/1992 | Kumagai | 382/22 |
| 5,237,627 | 8/1993 | Johnson et al. | 382/22 |

OTHER PUBLICATIONS

"An Orientation Free Study of Handprinted Characters", Pattern Recognition, Section 3.1 Determination of Inflection Points, A. J. Nevins, vol. 11, No. 3, 1979, Elmsford, NY, pp. 155–164.

"A Sequential Tracking Extraction of Shape Features and Its Constructive Description", S. Mori et al., Computer Graphics and Image Processing, vol. 19, No. 4, Aug. 1982, New York, pp. 349–366.

"The K–Forms", 5th Int. Conf. of Pattern Recognition, vol. 2/2, Dec. 1, 1980, pp. 933–936.

I. Sekita et al., "Feature Extraction of Handwritten Japanese Characters by Spline Functions of Relaxation Matching", Pattern Recognition, vol. 21, No. 2 (Pergamon Press, Oxford, 1988), pp. 9–17.

*Primary Examiner*—Yon J. Couso
*Attorney, Agent, or Firm*—Baker, Maxham, Jester & Meador

[57] ABSTRACT

A computer-implemented method is provided for extracting bending points from character images for use in an optical character recognition procedure that recognizes the characters. In a preferred aspect a contour (boundary of strokes) of a character image is traced and strong curvatures are detected as bending points using heuristically determined parameters with some attributes such as position, angle of curvature, convex or concave, and acuteness being provided as a data set output.

23 Claims, 10 Drawing Sheets

| | (y, x) | convex/ concave | direc tion | acute ness |
|---|---|---|---|---|
| a : | 1, 10 | conV | 0 | 6 |
| b : | 24, 1 | conV | 3 | 9 |
| c : | 16, 5 | conC | 1 | 3 |
| d : | 16, 12 | conV | 6 | 8 |
| e : | 13, 7 | conC | 3 | 5 |
| f : | 5, 10 | conC | 0 | 6 |
| g : | 24, 17 | conV | 5 | 9 |

FIG. 4

| | (y, x) | convex/ concave | direc tion | acute ness |
|---|---|---|---|---|
| a : | 1, 10 | conV | 1 | 5 |
| b : | 24, 2 | conV | 3 | 5 |
| c : | 13, 18 | conV | 6 | 2 |
| d : | 3, 5 | conC | 1 | 5 |
| e : | 22, 5 | conC | 3 | 5 |
| f : | 15, 16 | conC | 6 | 3 |

```
      0 2 4 6 8 0 2 4 6
    0
    1           5*  6*66*6
    2          3534 33  4
    3          01  13 00 0
    4           0   01 ee  a
    5        22 0d    cae h*  02
    6      531  d*   g*i hh*  5
    7      *2        *hh i 2*
    8       22a e*  *ca 0111
    9       42  d   d
   10           a   b
   11           0   0
   12        57*0   a
   13       231 5 0  c
   14        0  0  0 *b02
   15       00 0  0      11
   16       0 02 0  *e    00
   17      10b0   0 eba a 00
   18       3 0    0 b   00 01
   19       5 2    0 0    01 36
   20       7*6    0 0     346*
   21           0  a
   22           2  a
   23           4  0 4
   24           56*7
```
FIG. 27

BENDING POINT EXTRACTION METHOD FOR OPTICAL CHARACTER RECOGNITION SYSTEM

BACKGROUND OF THE INVENTION

The present invention relates to the generation of data for use in optical character recognition. More particularly, the invention concerns the acquisition of geometrical character feature data and topological information, specifically character bending points, for structural analysis and character classification in an optical character recognition system.

In optical character recognition, selected character data representing character features of interest are employed in a classification procedure that attempts to classify and thus recognize characters based on the character features provided as input. Among the various character features proposed for optical character recognition, character "bending points" have been given substantial recent attention. A bending point represents a topological curvature feature having attributes such as position and acuteness of curvature. High character recognition rates have been achieved when geometrical information including character bending points are used for structural analysis and character classification in an optical character recognition system. For example, it has been reported (H. Takahashi, "A Neural Net OCR Using Geometrical And Zonal-Pattern Features" (October, 1991)) that bending point features can be used to produce superior recognition rates in neural network optical character recognition systems employing back propagation methods.

Historically, the extraction of bending point information from input character data has been problematic. Characters may have multiple bending points and decisions must be made regarding the significance of each bending point feature such that insignificant features are excluded and relevant features are preserved. Complex algorithms have been proposed to identify appropriate extraction points. For example, I. Sekita et al, "Feature Extraction of Handwritten Japanese Characters by Spline Functions of Relaxation Matching", Pattern Recognition, Vol. 21, No. 1, pp. 9–17 (1988), discloses a time consuming spline approximation method. This method is said to require five times the CPU time of prior methods but is assertedly justified by improved character recognition rates.

No proposals have been made to date for a bending point extraction method which provides good recognition rates without undue processing time. Accordingly, given the high recognition rates obtainable with properly selected bending point data, there remains unsatisfied an evident need for a fast yet accurate bending point extraction method that overcomes the recognized deficiencies of existing procedures.

SUMMARY OF THE INVENTION

In view of the foregoing disadvantages and deficiencies of prior art proposals, it is a primary object of the present invention to provide a novel approach to bending point extraction for producing bending point data sets for use in optical character recognition.

It is a further object of the present invention to provide a bending point extraction method which produces a bending point data set with minimal cost in processing time.

It is a still further object of the present invention to provide a bending point extraction method which produces a bending point data set providing high character recognition rates.

These and other objects and advantages are achieved in a computer-implemented method for extracting bending points from character images for use in an optical character recognition system. In a preferred aspect of the invention a contour (boundary of strokes) of a character image is traced and strong curvatures are detected as bending points using heuristically determined parameters with selected attributes such as position, angle of curvature, convexity or concavity, and acuteness being provided as a data set output.

More particularly, the preferred methodology entails inputting a picture element (PEL) array pattern of black and white picture elements representing a character image to be recognized. The PEL array pattern includes a plurality of array positions representing contours of the character image. The PEL array pattern is scanned to trace one or more of the character image contours and a list of contour points is generated. For each contour point, an acuteness value representing an angle of contour curvature is calculated and placed in a list of acuteness values. The acuteness list is divided into contour groups, each contour group having a series of consecutive points that are either all convex or all concave in curvature. Selected bending points are then extracted from one or more contour groups using heuristically determined parameters in one or more iterations, and a bending point data set output is generated including a list of character bending points and their orientation and acuteness.

DETAILED DESCRIPTION OF THE PREFERRED EMBODIMENTS

Figure 1:
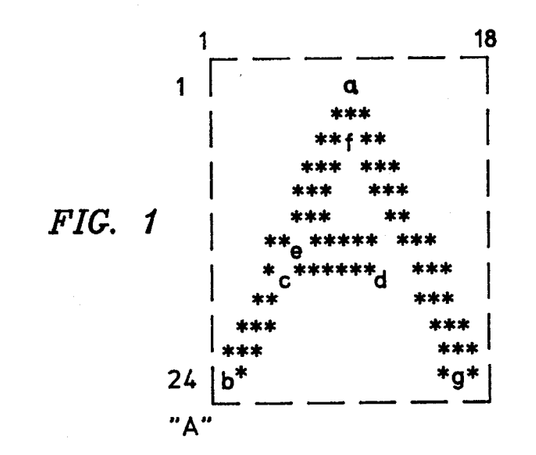
FIG. 1 is a diagrammatic illustration of a picture element (PEL) array pattern representing a character image to be recognized.
Figure 2:
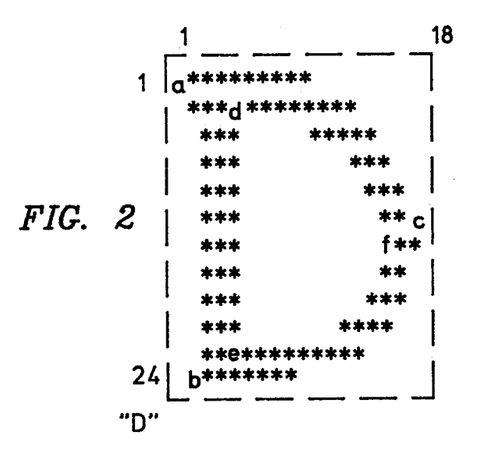
FIG. 2 is another diagrammatic representation of a PEL array pattern representing another character image to be recognized.

For any character image susceptible of recognition via automated optical character recognition procedures, there exits one or more bending points which may be considered unique to the class of which the character image is a member. FIGS. 1–4 show examples of character image bending points. In each figure, a character image is represented as a picture element (PEL) array pattern of 24×18 PELs. Each PEL array pattern includes white and black PELs with the black PELs being arranged to correspond to the character image. In FIGS. 1 and 2, black PELs are shown by an asterisk "*" and white PELs are shown as white spaces.

Figure 3:
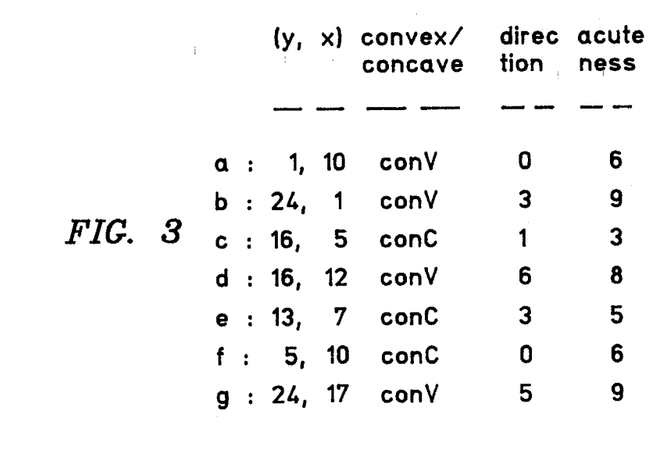
FIG. 3 is a bending point table listing significant bending points of the character image represented by FIG. 1.
Figure 4:
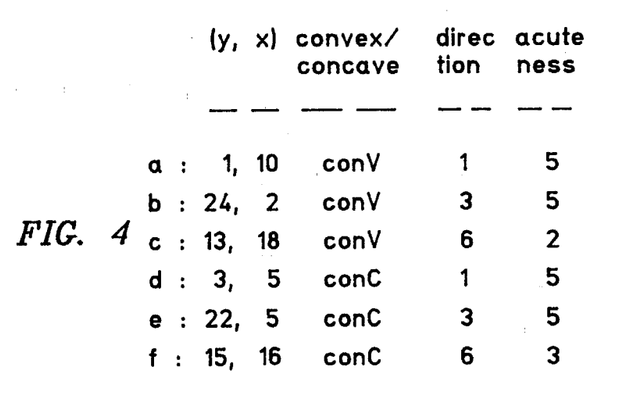
FIG. 4 is a bending point table representing significant bending points of the character image represented by FIG. 2.

FIG. 1 illustrates the character image "A". This image has seven bending points identified by the letters "a" through "g". FIG. 2 illustrates the character image "D" and shows six bending points labeled "a" through "f". The minimal number of bending points for any character image is usually two for images such as the number "1". In FIGS. 3 and 4, the bending points of FIGS. 1 and 2 are respectively tabularized to indicate x-y coordinate position, whether the bending point is convex or concave, the direction of the bending point and bending point acuteness. The x-y coordinates are the PEL array positions of the bending points. The convex/concave designation indicates the nature of the contour curvature at the bending point. The directions of bend are quantitized to eight (e.g., top=0, left=2, bottom=4, right=6, top-right=7, etc.). The acuteness is calculated using an angle of two lines from the bending point to the Nth previous point and from the bending point to the Nth following point. The sharper the angle, the higher the acuteness value (e.g., 9 represents very strong acuteness, 1 represents very weak acuteness).

Figure 5:
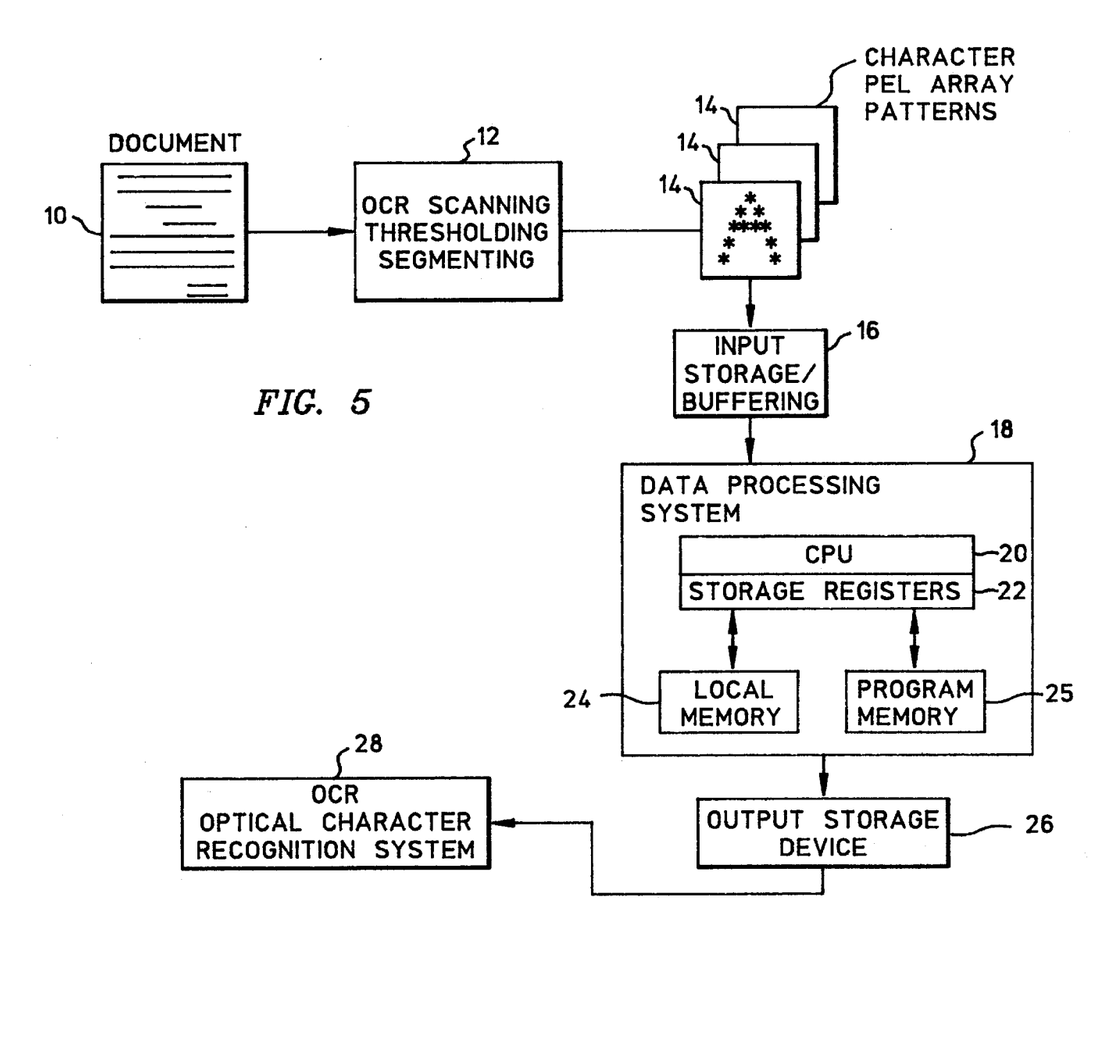
FIG. 5 is a block diagram illustrating a compute-implemented system for optically recognizing character images from a document.

The bending point extraction method of the present invention serves to generate bending point data sets from input character images for subsequent character recognition. In FIG. 5, a document 10 contains one or more character images to be recognized. It will be understood that the document 10 may include a wide variety of character image bearing media in many forms and configurations. For example, document 10 could be a letter containing alphanumeric text information or a drawing containing graphics and text information. The document 10 could also be a package or a label or tag with alphanumeric text information requiring scanning, as might be used, for example, on a postal package. Each input document 10 is scanned and thresholded and the characters are segmented using a conventional scanning, thresholding and segmenting apparatus 12. Devices of this type are well known in the art and typically include a document feed mechanism, a light source, a lens, plural optical sensing elements arranged in a line, a thresholding circuit and a segmenting circuit. The number of optical sensing elements is typically about eight elements/mm. That is, the PEL density in the main scan direction is typically around 200 PELs/inch and the PEL density in the sub-scan direction perpendicular to the main scan direction is also around 200 PELs/inch. One optical element generates an analog signal corresponding to one PEL, and this analog signal is applied to the threshold circuit. A binary "1" signal representing a black PEL is generated when the analog signal is lower than a predetermined threshold value, and a binary "0" signal representing a white PEL is generated when the analog signal is higher than the threshold. The segmenting circuit separates each character image into separate character PEL array patterns 14 as shown in FIG. 5. The PEL array patterns 14 can be stored in frames of 24×16 PELs, for example, in an input storage buffer 16, which is also conventional in nature.

It will be understood that the bending point extraction method of the present invention is invoked at a point in the optical character recognition process where characters have been obtained from a document whose objects have been scanned, thresholded and segmented and stored in the input storage buffer 16. The bending point extraction method may be implemented using a conventional data processing system 18 including a central processing unit (CPU) 20, one or more storage registers 22, local read-only and random access memory 24, and long-term program memory 26 for storing programs including executable instruction sets for performing the bending point extraction method of the present invention. Conventional data processing systems suitable for implementing the invention include stand-alone personal computers (PCs) such as the IBM PS/2™ from International Business Machines Corporation operating under IBM's OS/2™ Operating System. Other data processing systems include networked PCs and work stations, as well as mid-range and mainframe platforms. In a preferred aspect, the bending point extraction method is software implemented, but could also include partial hardware implementation, as discussed in more detail below. The data processing system 18 produces a bending point data set output which is stored in a conventional output storage device 26 utilizing a tape, disk or other known permanent storage media. The bending point data set stored in the output storage device 26 is presented as an input to an optical character recognition system 28. It will be understood and appreciated that various optical character recognition systems could be utilized to receive the bending point data set generated in accordance with the present invention including neural network OCR systems utilizing back propagation methods, as previously discussed in the section entitled Background of the Invention.

Figure 6A:
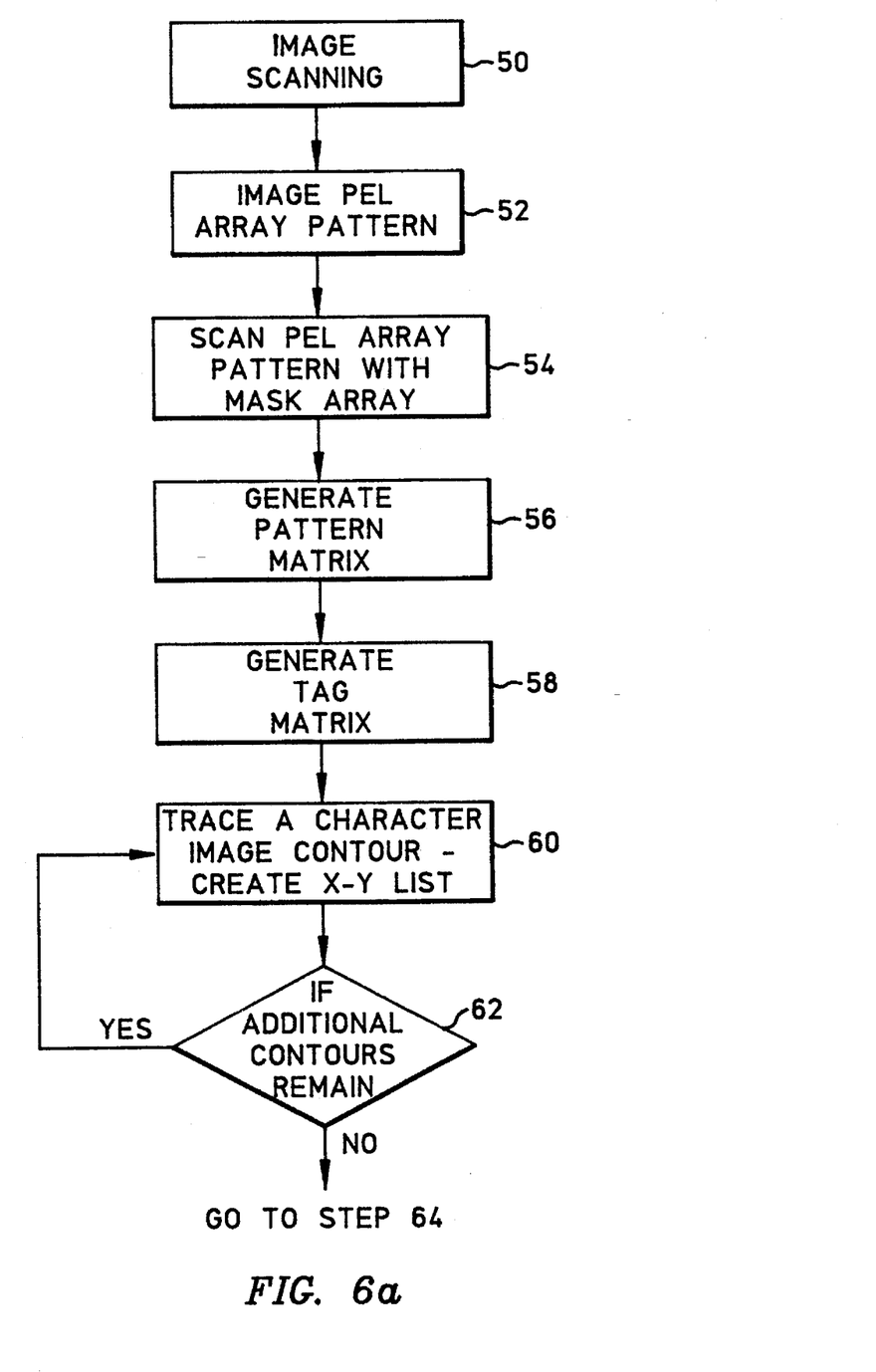
FIGS. 6a–6c constitute a flow diagram of a computer-implemented bending point extraction method in accordance with the present invention.
Figure 6B:
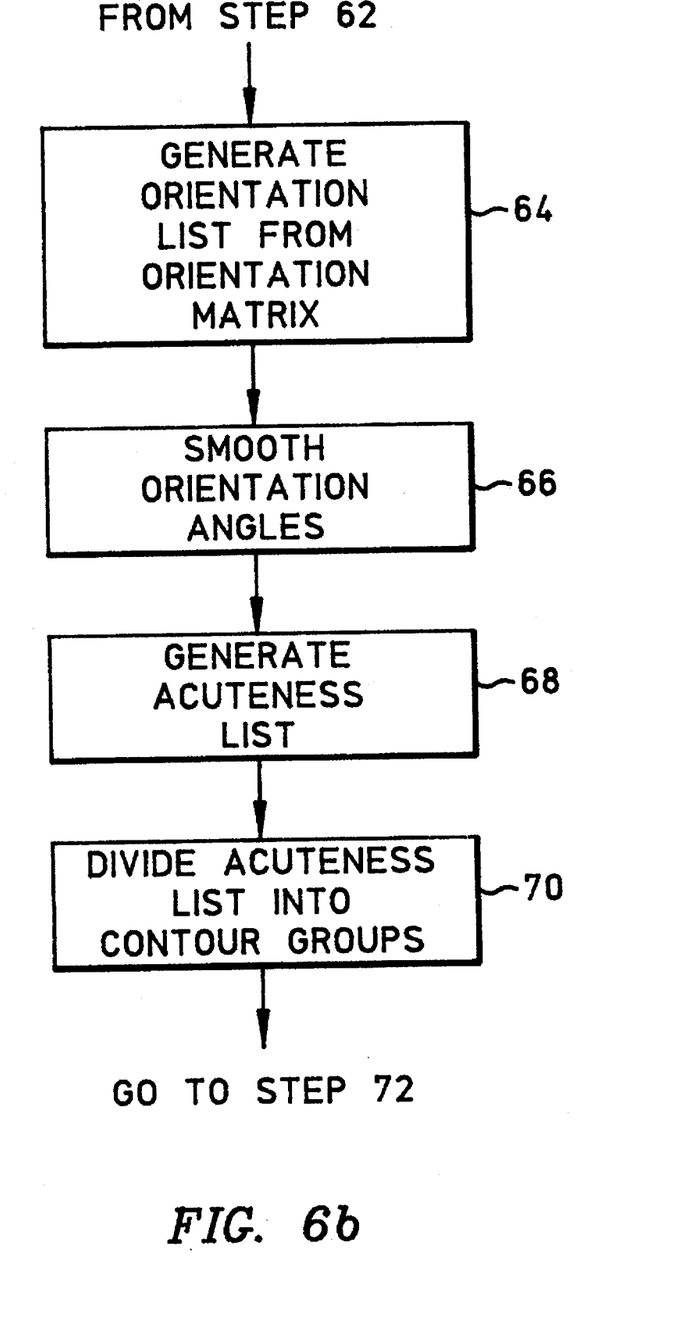
Figure 6C:
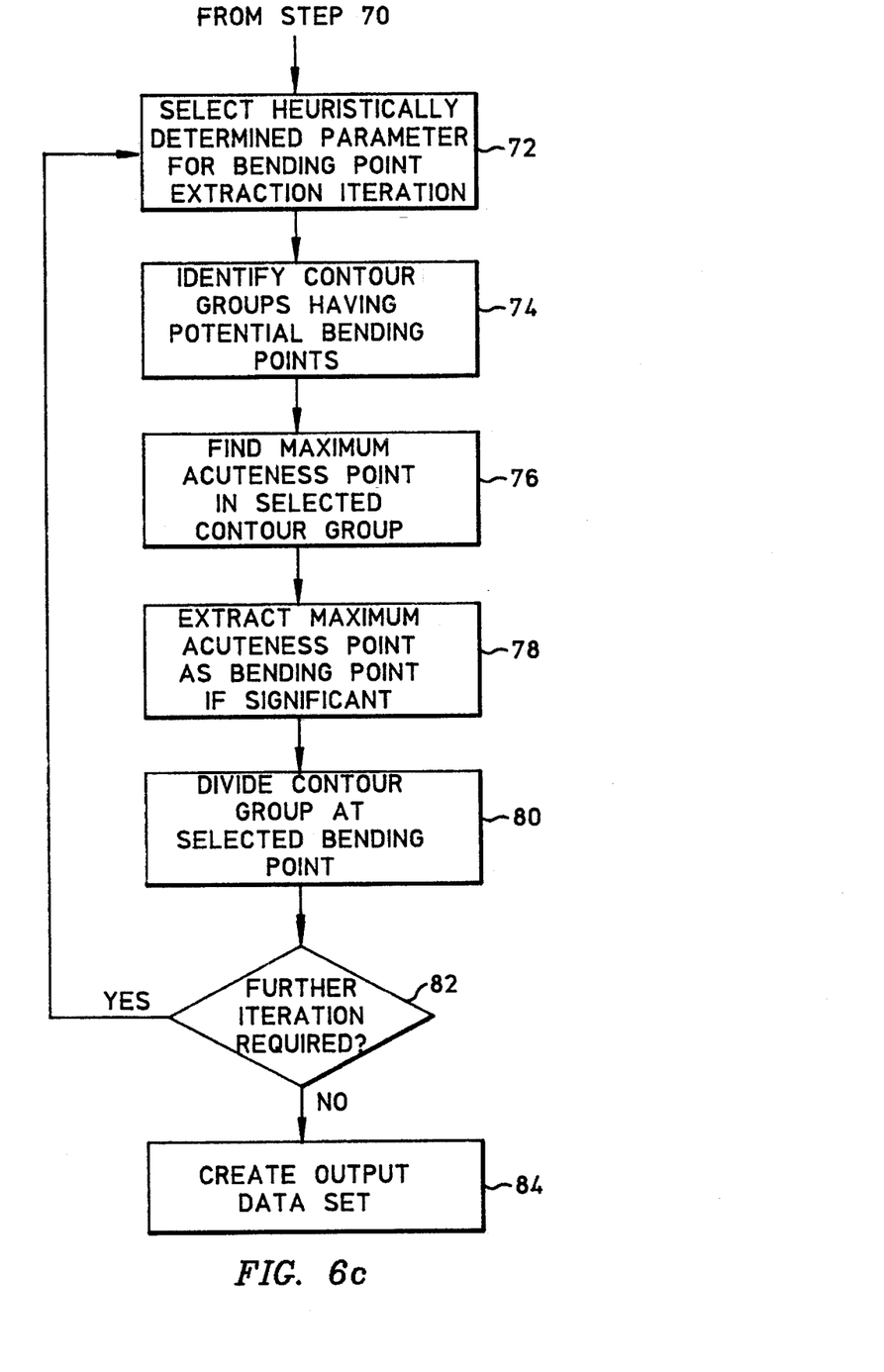
Figures 7, 7A, 7B, 8:
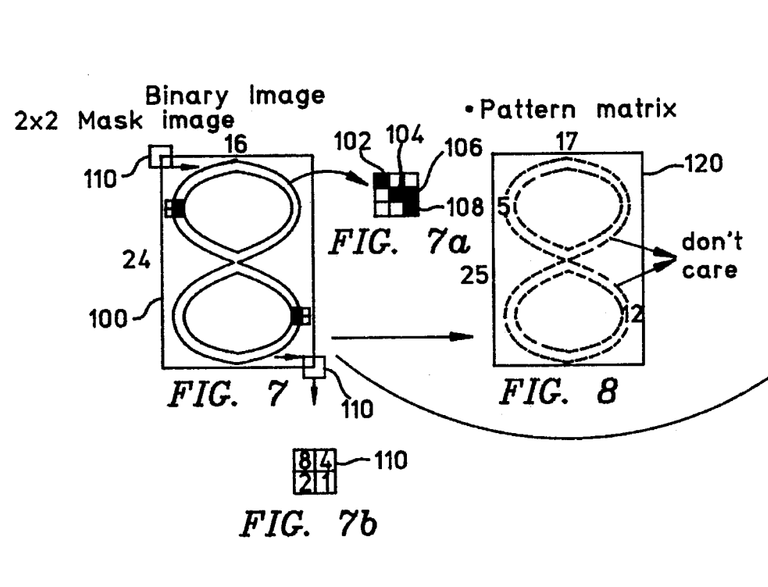
FIG. 7 illustrates a PEL array pattern and a mask array used for scanning the PEL array pattern
FIG. 7a is an enlarged view of a portion of the PEL array pattern of FIG. 7 showing the use of white and black colors in the PEL array pattern positions to represent a character image.
FIG. 7b is an enlarged view of the mask array of FIG. 7 showing the assignment of a binary value to each mask array position.
FIG. 8 is a diagrammatic illustration of a pattern matrix generated from the PEL array pattern of FIG. 7 in accordance with the invention.

Referring now to FIGS. 6a–6c, a preferred bending point extraction procedure will now be described with further reference being made to FIG. 7 using, by way example, a character image corresponding to the number "8". This number is used because it contains both exterior and interior contours, yet is not unduly convoluted or complex. Character image scanning is shown as occurring in step 50 of FIG. 6a to produce one or more PEL array patterns that are stored in the input storage buffer 16 described above. The PEL array pattern 100 of FIG. 7 is a 24×16 array of black and white picture elements representing the character image to be recognized. This PEL array pattern includes a plurality of array positions, including positions 102–108 shown in FIG. 7a, representing continuous contours of the character image. In step 52 of the bending point extraction procedure, the PEL array pattern 100 is input into the data processing system 18 and stored in local memory 24.

The first goal of the bending point extraction procedure is to trace the exterior and interior continuous contours of the character image 100 to generate a list of contour points for each contour traced. The procedure for tracing the contours of the character image "8" employs a 2×2 mask array 110 for scanning each line of the PEL array pattern 100 in a left to right horizontal sweep. FIG. 7b shows that the mask array 110 includes four array positions which are assigned binary place values of 8, 4, 2 and 1. Depending on the combination of black and white PELs appearing in these positions, values from zero to fifteen can be read from the mask array.

Figures 9, 9A:
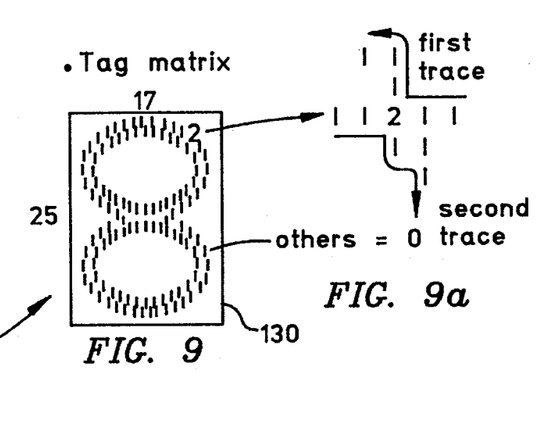
FIG. 9 is a diagrammatic illustration of a tag matrix generated from the PEL array pattern of FIG. 7 in accordance with the invention.
FIG. 9a is an enlarged view of the tag matrix of FIG. 9 showing the assignment of numerical values to PEL array pattern positions for use in contour tracing.

In process step 54 of the bending point extraction procedure, the mask array 110 is used to scan every position of the PEL array pattern 100. This scanning results in the generation of a pattern matrix and a tag matrix in process steps 56 and 58 of the bending point extraction procedure. The pattern matrix and tag matrix are shown in FIGS. 8 and 9, respectively. Each matrix includes 25×17 storage positions which are generated by virtue of the fact that the center of the mask array 110, as shown in FIG. 7, scans the PEL array pattern 100 from the left edge to the right edge, a starting from the top edge of the PEL array pattern and then between each row of the PEL array pattern until the bottom edge is reached. In this way, each interior position of the pattern and tag matrices will correspond to a position representing the intersection of four positions of the PEL array pattern 100.

Each element of the pattern matrix 120 has a value (0–15) which is a weighted sum determined from the colors of the four array positions of the 2×2 mask array 110. These values are used for deciding a tracing direction, as discussed below. Each element of the tag matrix is also assigned a value determined from the colors appearing in the positions of the mask array 110. If the mask array position are all white or all black, a value of zero (no contour) is assigned to the corresponding tag matrix position. If the mask array shows two black and two white PELs diagonally crossed) a value of two is assigned to the tag matrix. All other mask array color combinations result in a value of one being assigned to the tag matrix. The tag matrix 130 is used for tracing control such that contours are only traced once. A tag matrix value of two is a special case used for matrix positions that are part of two contours, as shown in FIG. 9a.

The procedure for scanning the PEL array pattern 100 to generate the pattern and tag matrices 120 and 130 can be advantageously implemented in software using conventional programming languages such as C or the like. Additionally, process steps 54–58 could be partially implemented in hardware using the storage registers 22 which preferably include a pair of 16-bit shift registers. In this implementation, successive line pairs of the PEL array pattern 100 are entered into the shift registers. By successive shifts of each register, values for each position of the 2×2 mask array 110 are read sequentially and used to generate the pattern and tag matrices. It will also be appreciated that the tag matrix 130 can be generated using the values from corresponding positions of the pattern matrix 120.

Figures 10, 11, 14:
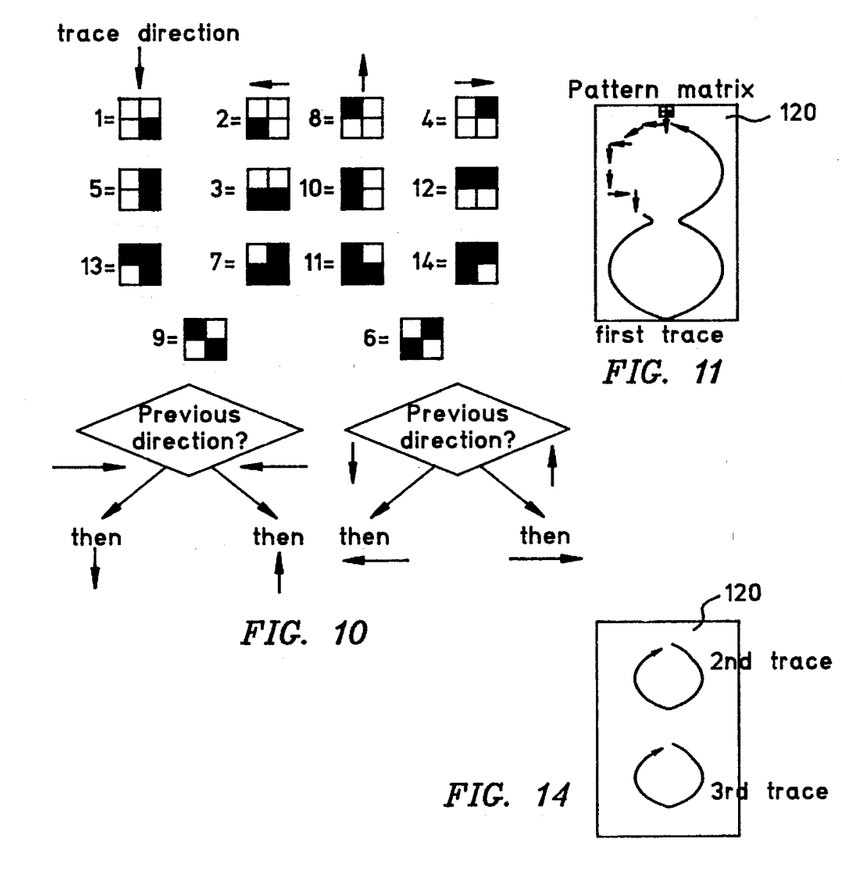
FIG. 10 is an enlarged view of the mask array of FIG. 7 showing the assignment of tracing directions to different mask array configurations resulting from scanning the PEL array pattern of FIG. 7.
FIG. 11 illustrates a first character image contour trace showing the tracing direction information provided by the pattern matrix values.
FIG. 14 illustrates second and third character image contour traces using the tracking direction information provided by the pattern matrix values.
Figures 12, 13, 15, 16:
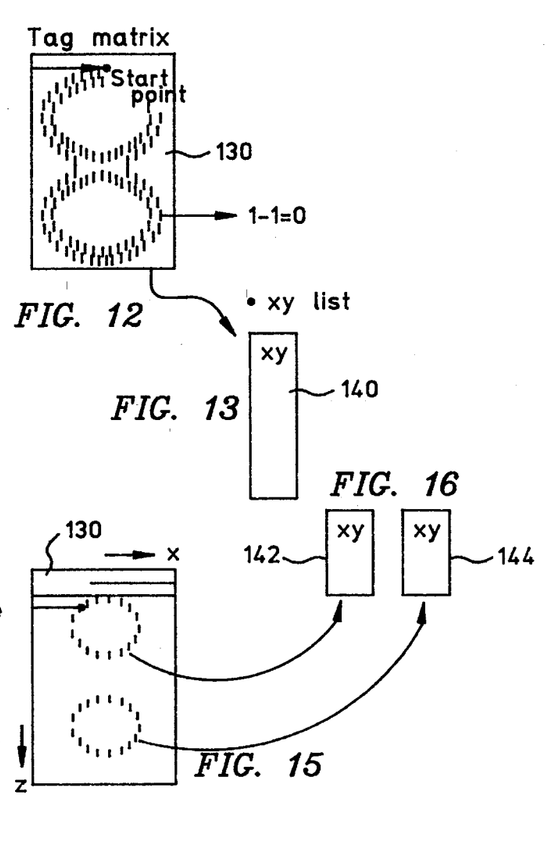
FIG. 12 illustrates a first character image contour trace using the tracing control information provided by the tag matrix values.
FIG. 13 illustrates an x-y coordinate listing of character image contour points resulting from a first character image contour trace.
FIG. 15 illustrates second and third character image contour traces using the tracing control information provided by the tag matrix values.
FIG. 16 illustrates x-y coordinate lists generated during second and third character image contour traces.

In process step 60 of the bending point extraction procedure, a first contour of the input character image is traced and an x-y list is created. In the tracing procedure, the tag matrix 130 is scanned in a left to right direction to find a first non-zero value indicating a contour starting point. The x-y tag matrix coordinate positions of the starting point are stored in an x-y coordinate list 140 as shown in FIG. 13. To determine a direction to the next contour point, the pattern matrix 120 is consulted at the corresponding x-y coordinate position. At this position, there will be stored a value between zero and fifteen corresponding to the pattern of white and black PELs contained in the mask array 110 when positioned at that point. Based on the number assigned to the pattern matrix storage position, a tracing direction is determined as shown in FIG. 10. Pattern matrix values of 1, 5 and 13 indicate a downward tracing direction. Pattern matrix values of 2, 3 and 7 indicate a leftward tracing direction. Pattern matrix values of 8, 10 and 11 indicate an upward tracing direction. Pattern matrix values of 4, 12 and 14 indicate a rightward tracing direction. When the pattern matrix value is 6 or 9, the direction value for the previous contour point is consulted to determine which direction to take, as shown in FIG. 10. It will be seen from FIG. 10 that the direction values assigned to the pattern matrix are intuitively correct based on the appearance of the corresponding mask array patterns. If the mask array is thought of as a window overlying the PEL array pattern, each mask array pattern will appear to correspond to a location on the contour of the input character image. FIG. 8, for example, illustrates locations on the character contour patterns where mask arrays having values of 12 and 5 would be generated. It is easy to see that the directions assigned to the mask array values will cause the character contour to be followed during the tracing process.

For the PEL array pattern of FIG. 7, the trace starting point determined from the tag matrix 130 corresponds to a pattern matrix value of 1. As shown in FIG. 11, the direction to the next contour point in downward. The remaining arrows in FIG. 11 show successive tracing directions based on the pattern matrix value at each subsequent contour point. FIG. 12 illustrates the starting contour point of the tag matrix 130. Once the x-y coordinates of the starting point are placed in the x-y list, the tag matrix value at that location is decremented by 1 to indicate that the contour point has been treated. The x-y coordinate of the next contour point is then determined from the tag matrix 130 by moving one position in the tracing direction determined from the pattern matrix 120. The x-y coordinates of the new contour point are then stored in the x-y list and the process continues in similar fashion until the entire contour is traced. FIG. 13 illustrates an x-y list 140 generated by the tracing procedure. This trace will produce a list of x-y coordinate points defining the exterior contour of the input character image "8". Subsequent second and third traces are performed in similar fashion as shown in FIGS. 14, 15 and 16 and x-y lists 142 and 144 are generated for the interior contours of the number "8". Following generation of the x-y lists 140, 142 and 144, the PEL array pattern 110, the pattern matrix 120 and tag matrix 130 are no longer required and may be discarded, all contour points having been identified and stored in the respective x-y lists. Step 62 of the bending extraction procedure illustrates testing to determine whether additional contours remain.

Figure 17:
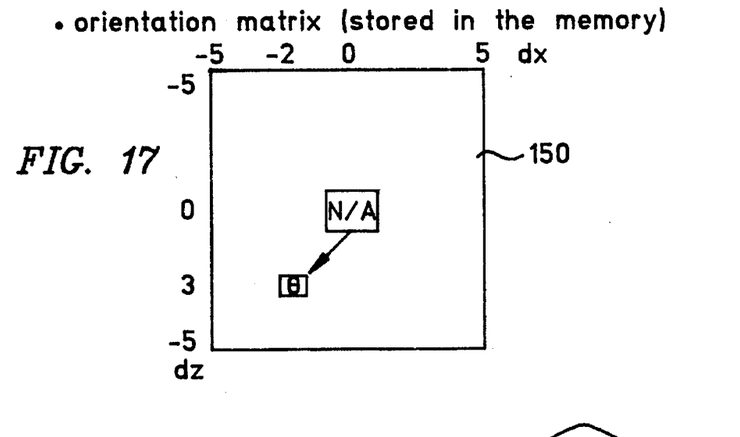
FIG. 17 illustrates a stored orientation matrix for use in determining relative orientations between coordinates of the x-y coordinate lists of FIGS. 13 and 16.
Figure 18:
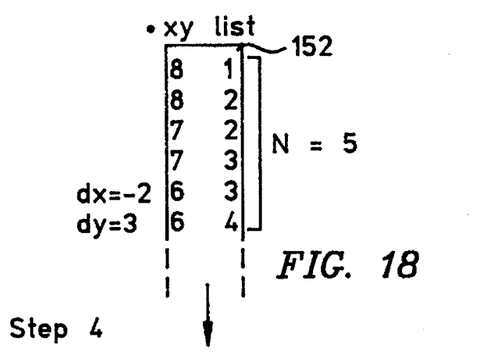
FIG. 18 is an enlarged x-y coordinate list showing the manner in which differential x and y values may be obtained between contour points and input as address values to the orientation matrix of FIG. 17.

Following the identification of all character contours, the bending point extraction procedure implements process step 64. There, an orientation list representing the orientation directions between selected points in the x-y list is generated. As shown in FIG. 17, the orientation list can be rapidly generated using an orientation matrix look-up table 150. The orientation matrix 150 has plural storage positions, each storage position containing a value representing an orientation direction between a contour point and a selected subsequent contour point. The orientation matrix is addressable using x-y offset values representing the difference in x-y coordinate value between the contour point and the selected subsequent contour point. By way of example, FIG. 18 illustrates an x-y list 152 containing a series of x-y contour point coordinate values. It is desirable to find an orientation direction from each contour point to an Nth following contour point. The number used for the threshold increment N may vary but satisfactory results have been achieved using N=3 for 24×16 PEL array patterns. For PEL array patterns with more positions, high N values could be used. FIGS. 17 and 18, for example, are based on a threshold increment value of N=5.

Figure 19:
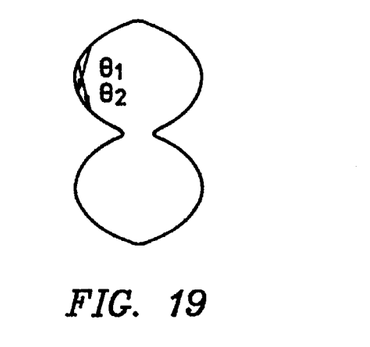
FIG. 19 diagrammatically illustrates the assignment of orientation values to points along a character image contour.
Figure 20:
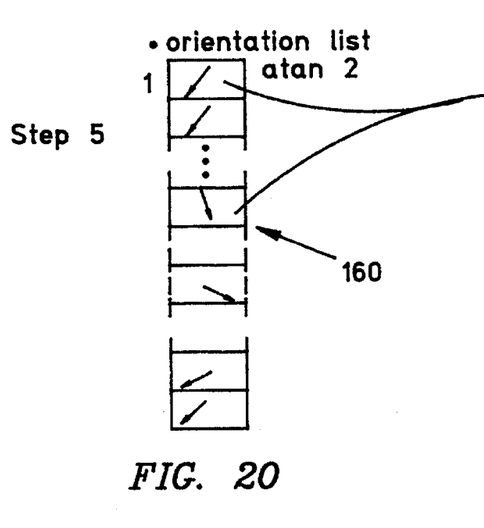
FIG. 20 illustrates an orientation list of orientation value assigned to character image contour points.

The orientation for each contour point is thus defined as an arrow from the contour point to the Nth following point. It is quickly obtained using the precalculated orientation matrix 150, which preferably consists of (2N+1)×(2N+1) elements. In FIG. 8, the x-y offset values between the first contour point (x=8, y=1) in the x-y list 152 and the fifth following contour point (x=6, y=4) in the x-y list is the dx=−2, dy=3. Using these values as addresses in the orientation matrix 150, it is seen that an orientation value Θ representing an angle from a reference direction (e.g. zero degrees) to the orientation direction is quickly determined. FIG. 19 graphically illustrates how the orientation values relate to the exterior contour of the letter "8". The orientation values determined in step 64 of the bending point extraction procedure are stored in an orientation list 160 as shown in FIG. 20. In some cases, it may be desirable to perform a smoothing process as in step 66 of the bending point extraction procedure to provide enhanced orientation continuity between the contour points. The smoothing process determines a more general angle between contour points by taking a weighted average of orientation values for the contour points immediately preceding and succeeding the contour point of interest. For example, a smoothed orientation value $\Theta_i$ for the ith contour point can be determined from the orientation values $\Theta_{i-1}$ and $\Theta_{i+1}$ for the immediately proceeding and succeeding contour points in accordance with the following formula:

$$(\Theta_{i-1}+2\Theta_{i+1})/4$$

It is to be noted that smoothing is not generally required where the PEL array pattern is sized at 50×50 PELs or larger and the threshold increment N is around 7 or more contour points.

Figure 21:
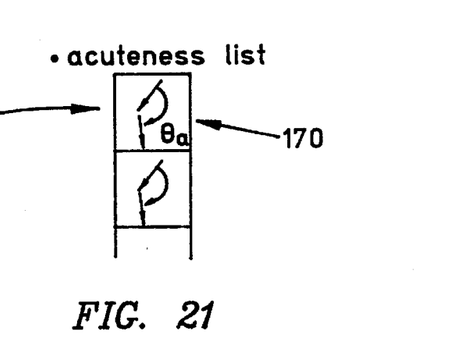
FIG. 21 illustrates an acuteness list generated from the orientation list of FIG. 20.

Following generation of the orientation list and smoothing thereof, the bending point extraction procedure generates an acuteness list in process step 68. The acuteness list is shown in FIG. 21 as reference number 170. The acuteness list is generated by determining values representing the acuteness angle of curvature between each contour point and the Nth following contour point. The acuteness angle is readily found by finding the difference between the orientation values $\Theta_i$ and $\Theta_{i+N}$ assigned to the $i^{th}$ and (i+N)th contour points. The value of N is preferably the same as that used in assigning orientation values.

Figure 22:
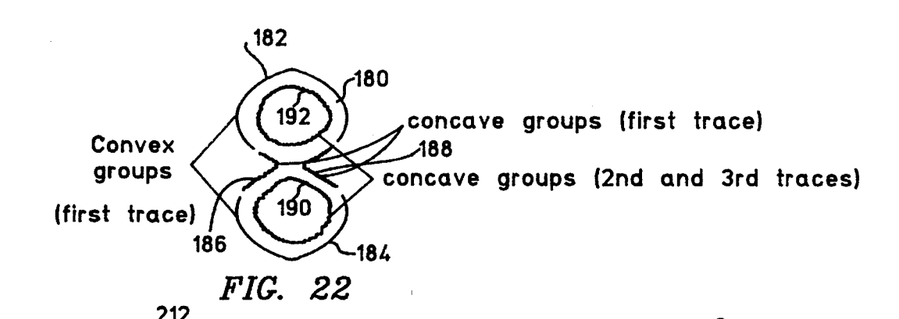
FIG. 22 is a diagrammatic illustration of a character image corresponding to the PEL array pattern of FIG. 7 showing convex and concave contour groups derived from tracing contours of the character image.

In process step 70 of the bending point extraction procedure, the acuteness list 170 is divided into one or more contour groups. Each contour group consists of a series of consecutive contour points that are either all convex or all concave in curvature. Concavity and convexity is readily determined form the angle of curvature. Angles of curvature that are less than or equal to 180 degrees, looking from the Nth previous point to the Nth following point are considered convex. All other angles of curvature are concave. FIG. 22 illustrates the result of identifying convex and concave contour point groups for the character "8". There are two convex contour groups 182 and 184. Contour groups 186, 188, 190 and 192 are all concave groups.

Figure 23:
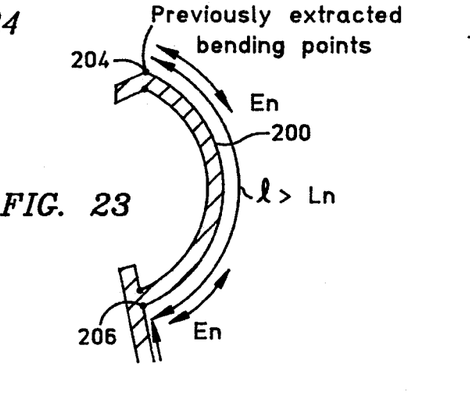
FIG. 23 is a diagrammatic illustration of the significance of various heuristically determined parameters used for bending point extraction in accordance with the invention.

The next series of bending point extraction steps seek to extract bending points based on heuristically determined parameters. These parameters are determined by experiment prior to performing the bending extraction procedure. Essentially, a best initial approximation is made and the parameters are optimized to yield the highest possible recognition rates. Three kinds of parameters are used. A first parameter $A_n$ represents an acuteness threshold which is used to reject bending points having an angle of acuteness below the acuteness threshold. A second parameter is an edge value $E_n$ which is used to eliminate bending points within $E_n$ contour points from the edge of each contour group. This parameter maintains appropriate spacing between selected bending points. A third parameter $L_n$ represents a minimum length threshold that is used to reject contour groups having a length that is less than $L_n$ contour points. FIG. 23 illustrates graphically the use of the edge and length parameters $E_n$ and $L_n$. Considering a contour group 200 extending between previously extracted bending points 204 and 206, the $E_n$ parameter eliminates bending points within $E_n$ points of each previously extracted bending point and the $L_n$ parameter eliminates the contour group if there are less than $L_n$ remaining points therein.

The extraction of significant bending points from the contour groups is performed in a series of iterations. For each iteration, there is a process step 72 wherein values for the $A_n$, $E_n$ and $L_n$ parameters are selected (e.g. from a parameter look-up table) for use in the iteration. The subscript n designates the iteration step. With each iteration, different parameters are used to extract different bending points. In process step 74 of the bending point extraction procedure, a first bending point extraction step is the identification of contour groups having potential bending points. This step utilizes the edge parameter to eliminate $E_n$ points from the ends of each contour group and the length parameter to eliminate contour groups having a length of less than $L_n$ points. A next process step 76 finds a contour point having a maximum acuteness value in each selected contour group. In process step 78, the identified maximum acuteness point is extracted as a bending point if it is determined to be significant. The bending point is significant if its acuteness exceed the acuteness threshold $A_n$. If the acuteness threshold is not met, the maximum acuteness point is discarded. Following the extraction of significant bending points from the selected contour groups, each contour group having a bending point extracted therefrom is divided at the bending point into one or more contour subgroups. Thereafter, if further iteration is required, as determined in process step 82, the procedure returns to process step 72 and new parameter values are assigned for the next iteration.

As indicated, each bending point extraction iteration seeks to identify bending points of differing significance. Look-up table 1 below shows an example of a parameter table containing parameter values for four heuristic steps:

TABLE 1

EXAMPLE OF PARAMETERS

| Step | $A_n$ | $E_n$ | $L_n$ |
|------|-------|-------|-------|
| 1 | S | — | — |
| 2 | L | M | — |
| 3 | S | L | L |
| 4 | M | M | M |

L: Large value
M: Medium Value
S: Small Value
—: Not Applied

Step 1 tries to extract one bending point from each contour group having even small curvatures. In Table 1, the acuteness parameter An is shown having a small value "S" indicating that the curvature threshold is weak. It will also be noted that the length parameter is not assigned a value in the first iteration. This results in each contour group being treated regardless of length. Moreover, because no previous bending points have been extracted, there is no need to eliminate edge points to provide spacing between extracted bending points. Thus, the edge parameter is also not assigned a value. The second iteration of Table 1 seeks to extract bending points from contour groups having strong curvature. In this step, a large value "L" is assigned to the acuteness threshold $A_n$ to accept only contour groups having strong curvature. A medium value "M" is assigned to the edge parameter $E_n$. This provides medium spacing between the bending point selected in the second iteration and previously extracted bending points. No value is assigned to the length parameter $L_n$ such that length is not a factor in the second iteration. The third iteration of Table 1 seeks to extract bending points from long gentle curvatures as in the letter "O". The threshold parameter $A_n$ is assigned a very small value "S" to accept contour groups having even weak curvatures. The edge parameter $E_n$ is assigned a large value "L" to provide maximum spacing between bending points, and the length parameter $L_n$ is also assigned a large value "L" to accept only long contour groups. A fourth step is used in Table 1 because the first three iterations sometimes leave desirable bending points. In the fourth iteration, medium values "M" are assigned to each of the parameters $A_n$, $E_n$ and $L_n$.

Figure 24:
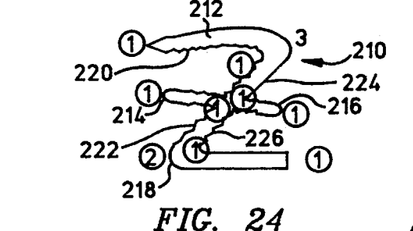
FIG. 24 diagrammatically illustrates the extraction of bending points as a result of three bending point extraction iterations.
Figure 25:
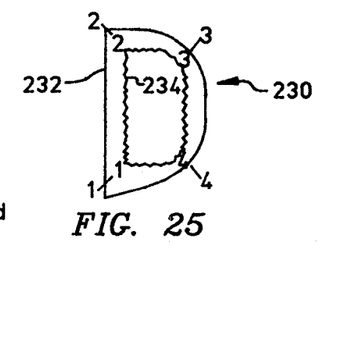
FIG. 25 diagrammatically illustrates the extraction of bending points as a results of four bending point extraction iterations.

FIGS. 24 and 25 graphically illustrate the effects of each iteration using the parameter values of Table 1. In FIG. 24, the letter "Z" is treated. This letter, designated by reference number 210, includes initial convex contour groups 212, 214, 216 and 218. It includes initial concave contour groups 220, 222, 224 and 226. The bending points extracted in the first iteration are shown by the reference number 1. As described, a bending point is extracted from each of the contour groups. These contour groups are then divided at each of the selected bending points. In the second iteration, which tests for strong curvatures, a single bending point "2" is extracted and the contour group containing that point is divided. In the third iteration, a bending point "3" is extracted from a contour group having long gentle curvature. FIG. 25 shows the letter "D", identified by reference number 230. Initially, this character includes a single convex contour group 232 and a single concave contour group 234. In a first bending point extraction iteration, a single bending point "1" is extracted from each contour group and the contour groups are divided. In a second iteration, bending points "2" having high acuteness are extracted from each contour group and the contour groups are again divided at the extracted bending points. In a third iteration, bending point "3" is extracted from two remaining contour groups having long gentle curvatures. Finally, in a fourth iteration, remaining bending points "4" are extracted.

The effect of using the parameters from Table 1 on character recognition rate can be determined from the optical character recognition rates achieved. If desired, the parameters can be adjusted or more iteration steps added and effective values can be determined on a trial and error basis. Once a set of optimized parameter values are obtained, it can be expected that desirable bending points will be extracted that match well with human intuition.

In process step 84 of the bending point extraction procedure, a bending point output data set is generated. This data set contains the information shown below in Table 2:

TABLE 2

| np = 126 = | number of contour points in first (exterior) contour |
| maxpng 20 = | number of convex/concave groups in first contour |
| np = 8 = | number of contour points in second (interior) contour |
| maxpng 1 = | number of convex/concave groups in second contour |
| np = 26 = | number of contour points in third (exterior) contour |
| maxpng 2 = | number of convex/concave groups in third contour |

| n | y | x | d | c |
|---|---|---|---|---|
| n = 14 | y = 6 | x = 6 | d = 7 | c = −6 |
| n = 14 | y = 7 | x = 1 | d = 4 | c = 6 |
| n = 14 | y = 8 | x = 6 | d = 1 | c = −6 |
| n = 14 | y = 24 | x = 8 | d = 7 | c = 7 |
| n = 14 | y = 16 | x = 8 | d = 3 | c = −6 |
| n = 14 | y = 20 | x = 16 | d = 7 | c = 7 |
| n = 14 | y = 8 | x = 8 | d = 3 | c = −4 |
| n = 14 | y = 7 | x = 16 | d = 0 | c = 5 |
| n = 14 | y = 1 | x = 14 | d = 2 | c = 7 |
| n = 14 | y = 5 | x = 13 | d = 6 | c = −8 |
| n = 14 | y = 1 | x = 11 | d = 2 | c = 7 |
| n = 14 | y = 6 | x = 10 | d = 6 | c = −9 |
| n = 14 | y = 1 | x = 8 | d = 2 | c = 6 |
| n = 14 | y = 14 | x = 8 | d = 5 | c = −4 |
| n = 2 | y = 7 | x = 11 | d = 4 | c = −6 |
| n = 2 | y = 6 | x = 14 | d = 0 | c = −6 |
| n = 2 | y = 12 | x = 5 | d = 1 | c = 7 |
| n = 2 | y = 20 | x = 1 | d = 6 | c = 7 |

Figure 26:
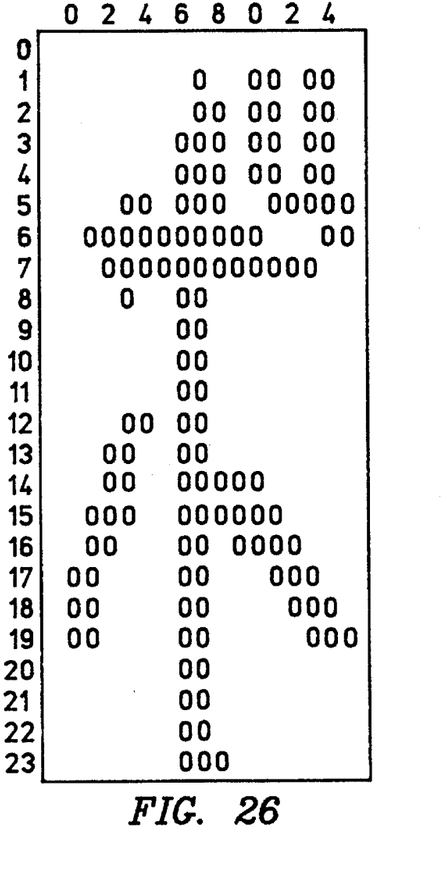
FIG. 26 is a diagrammatic illustration of a sample input character image.
Figure 27:
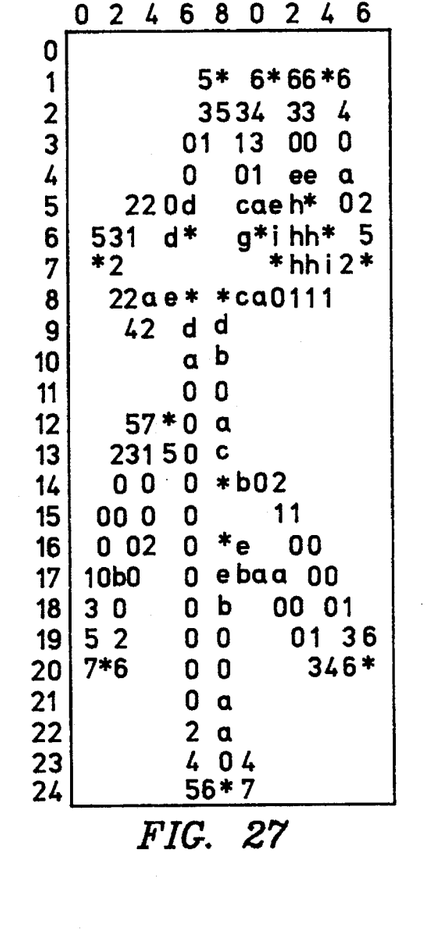
FIG. 27 is a diagrammatic illustration of a bending point data output set generated in accordance with the invention.

The bending point information listed in Table 2 corresponds to a Japanese Katakana (phonetic) character which can be graphically output for operator confirmation as shown in FIGS. 26 and 27. In FIG. 26, the strokes of a character are shown as "0". In FIG. 27, extracted bending points are shown as asterisks "*". In addition, each convex point is associated with a number from 1 to 9 representing the acuteness value. Each concave point is assigned a letter from "a" to "i" also representing acuteness (i.e., a=−1 ... i=−9). The resultant data set includes an identification of all character contours, the number of contour points in each contour, the number of convex/concave contour groups in each contour, and an identification of all bending points in the character image including the x-y bending point coordinates, the contour acuteness at each bending point (positive values are convex, negative values are concave) and the contour orientation at each bending point. This data set can be passed to a selected optical character recognition program for character recognition.

Thus, an automated bending point extraction method and apparatus for optical character recognition has been shown and described. Advantageously, bending points may be quickly extracted in comparison to prior art methods by using table look-up techniques. By analyzing desired bending points, a heuristic method is designed and essential parameters are developed. The parameters have different values for each heuristic step. This enables the flexible extraction of bending points for various curvatures, small/large and gentle/sharp. By repeating the bending point extraction step on a trial and error basis, users can select optimum values of the parameters to get bending points which match well with human intuition. The bending point extraction method of the present invention is believed to be competitive with more complex prior art algorithms. Using simple values of parameters for each heuristic step, bending points can be flexibly extracted for various curvatures. Because the method utilizes table look-up techniques, processing speed is reduced.

While several preferred embodiments of the invention have been disclosed, it should be understood that modifications and adaptations thereof will occur to persons skilled in the art. Therefore, the protection afforded the invention should not be limited except in accordance with the spirit of the following claims and their equivalents.

I claim:

1. A computer-implemented bending point extraction method for selectively identifying bending points in a character image and generating a corresponding data set for use as input to an optical character recognition procedure that identifies the character image, the bending point extraction method comprising the steps of:

inputting a picture element (PEL) array pattern of black and white picture elements representing a character image to be recognized, the PEL array pattern including a plurality of array positions representing continuous contours of the character image;

scanning the PEL array pattern to trace one or more continuous contours of the character image and generating a list of contour points for each traced contour;

determining for each contour point an acuteness value representing an angle of contour curvature and generating a list of acuteness values for each traced contour;

separating each acuteness list into contour groups, each contour group having a series of a consecutive points that are either all convex or all concave in curvature;

selecting one or more heuristically determined parameters for use in identifying bending points to be extracted;

identifying contour groups having potential bending points therein using at least one of said heuristically determined parameters and extracting selected bending points from one or more of said identified contour groups using at least one of said heuristically determined parameters in one or more iterations, said parameters defining one or more contour group properties and having different values in successive iterations to identify bending points that meet or exceed the threshold values imposed by the heuristically determined parameters and which are of different significance relative to the optical character recognition procedure.

2. The method of claim 1 wherein the step of tracing one or more contours of the character image includes identifying a tracing starting point on each contour and determining a direction to a next contour point based on the position of the tracing starting point in the contour.

3. The method of claim 1 wherein the step of tracing one or more contours of the character image includes identifying a tracing starting point on each contour and determining a direction to a next contour point based on the color of adjacent positions in the PEL array pattern.

4. The method of claim 1 wherein the step of tracing one or more contours of the character image includes assigning a tracing direction value to each contour point representing a direction to a next contour point.

5. The method of claim 4 wherein the step of assigning a tracing direction value includes generating a pattern matrix having plural storage positions corresponding to the contour points, said pattern matrix being generated by scanning the PEL array pattern with a mask array, determining the number and position of black and white PELs appearing in the mask array, and assigning direction values to the pattern matrix storage positions based on the information determined from the mask array.

6. The method of claim 5 wherein the mask array is a two by two element array capable of indicating a total of fourteen PEL combinations and wherein the step of assigning direction values includes assigning one of four tracing directions based on the PEL combination appearing in said array.

7. The method of claim 1 wherein the step of tracing one or more contours of the character image includes maintaining tracing control information indicating contour points that remain eligible for tracing.

8. The method of claim 1 wherein the step of tracing one or more contours of the character image includes assigning a value to each contour point representing the number of times the contour point remains eligible for tracing.

9. The method of claim 1 wherein the step of tracing one or more contours of the character image includes generating a tag matrix having plural storage positions corresponding to the contour points, each tag matrix storage position containing a value indicating the number of times an associated contour point remains eligible for tracing.

10. The method of claim 9 wherein the tag matrix is generated using said pattern matrix by assigning a value to each tag matrix storage position based on a value in a corresponding storage position of said pattern matrix.

11. The method of claim 1 wherein the step of generating a list of contour points includes generating a list of x-y coordinate values for each contour point.

12. The method of claim 1 wherein the step of determining an acuteness value for each contour point includes generating a list of orientation values representing orientation directions from each contour point to a selected subsequent contour point, and wherein the acuteness value for each contour point is the angular difference in orientation value between the contour point and the selected subsequent contour point.

13. The method of claim 12 wherein the step of generating a list of orientation values includes using an orientation matrix having plural storage positions, each storage position containing a value representing an orientation direction and being addressable using x-y offset values representing a difference in x-y position between each contour point and a selected subsequent contour point.

14. The method of claim 12 wherein the step of determining an acuteness value for each contour point further includes smoothing the orientation values to provide enhanced orientation continuity between each contour point and a selected subsequent contour point.

15. The method of claim 1 wherein, following the extraction of a bending point from each contour group, the contour group is divided at the bending point into one or more contour subgroups and the step of extracting selected bending points is repeated for each contour subgroup.

16. The method of claim 1 wherein the heuristically determined parameters include an acuteness parameter $A_n$, an edge parameter $E_n$ and a length parameter $L_n$.

17. The method of claim 16 wherein the $A_n$ parameter is used for excluding insignificant contour points by defining a minimum acuteness $A_n$ for bending point selection and wherein the $E_n$ and $L_n$ parameters are used to exclude insignificant contour groups by defining a minimum number $E_n$ of edge points that are to be excluded from each contour group and a minimum length $L_n$ for each contour group.

18. The method of claim 17 wherein the $A_n$, $E_n$ and $L_n$ parameters are heuristically selected to be either strong, medium or weak as required for each bending point extraction iteration.

19. The method of claim 17 wherein said step of extracting selected bending points is performed in four iterations including a first iteration wherein the $A_n$, $E_n$ and $L_n$ parameters are selected such that a bending point is initially extracted from contour groups having even weak curvature, a second iteration wherein the $A_n$, $E_n$ and $L_n$ parameters are selected such that a bending point is extracted from contour groups having strong curvature, a third iteration wherein the $A_n$, $E_n$ and $L_n$ parameters are selected such that a bending point is extracted from contour groups having long gentle curvatures, and a fourth iteration wherein the $A_n$, $E_n$ and $L_n$ parameters are selected such that a bending point is extracted from contour groups of medium curvature and length.

20. A computer-implemented bending point extraction method for selectively identifying bending points in a character image and generating a corresponding data set for use as input to an optical character recognition procedure that identifies the character image, the bending point extraction method comprising the steps of:

inputting a picture element (PEL) array pattern representing a character image to be recognized;

scanning the PEL array pattern using a mask array to generate a pattern matrix and a tag matrix, each matrix being adapted for tracing contours of the character image and having plural storage positions corresponding to the intersections of successive groups of four array positions of the PEL array pattern, the pattern matrix containing tracing direction information and the tag matrix containing tracing control information;

tracing a contour of the character image by (a) scanning the tag matrix to find a starting contour position, (b) extracting x and y coordinates of the contour position and adding the coordinates to an x-y list, (c) reading the pattern matrix at the contour position to determine a direction to a next contour position, (d) adjusting the tag matrix to indicate the contour position has been treated, (e) moving to the next contour position determined from the pattern matrix, and (f) repeating steps (b)–(e) until the contour has been traced;

generating an orientation list of orientations between selected points in the x-y list using an orientation matrix having plural storage positions, each storage position containing a value representing an orientation direction and being addressable using x-y offset values representing differences in x-y coordinate value between each contour point and a selected subsequent contour point;

smoothing the angles in the orientation list to provide enhanced orientation continuity between the selected points;

calculating a value representing an acuteness angle of curvature between the selected points and generating an acuteness list containing the calculated acuteness values;

dividing the acuteness list into contour groups, each contour group having a series of consecutive points that are either all convex or all concave in curvature;

extracting selected bending points from the contour groups using heuristically determined parameters including an acuteness parameter $A_n$, and edge parameter $E_n$ and a length parameter $L_n$, by (g) identifying contour groups having a potential bending point using the edge parameter to eliminate $E_n$ points form the ends of each contour and the length parameter to eliminate contour groups having a length of less than $L_n$ points, (h) finding a maximum acuteness point in each identified contour group, (i) extracting the maximum acuteness point as a bending point using the acuteness parameter to eliminate points having an acuteness of less than $A_n$, (j) dividing each contour group at the bending point into one or more contour subgroups, and (k) repeating steps (g)–(j) as required to obtain desired bending points;

said step of extracting selected bending points being performed in four iterations including a first iteration wherein the $A_n$, $E_n$, and $L_n$ parameters are selected such that a bending point is initially extracted from each contour group having even weak curvature, a second iteration wherein the $A_n$, $E_n$ and $L_n$ parameters are selected such that a bending point is extracted from contour groups having strong curvature, a third iteration wherein the $A_n$, $E_n$ and $L_n$ parameters are selected such that a bending point is extracted form contour groups having long gentle curvatures, and a fourth iteration wherein the $A_n$, $E_n$ and $L_n$ parameters are selected such that a bending point is extracted form contour groups of medium curvature and length; and generating a bending point data set including an identification of all character contours, the number of contour points in each contour, the number of convex/concave contour groups in each contour, and an identification of all bending points in the character image including the x-y bending point coordinates, the contour acuteness at each bending point and the contour orientation at each bending point.

21. A computer-implemented bending point extraction method for selectively identifying bending points in a character image and generating a corresponding data set for use as input to an optical character recognition procedure that identifies the character image, the bending point extraction method comprising the steps of:

inputting a picture element (PEL) array pattern of black and white picture elements representing the character image to be recognized, the PEL array pattern including a plurality of array positions representing continuous contours of the character image;

scanning the PEL array pattern to trace one or more continuous contours of the character image and generating a list of contour points for each traced contour;

determining for each contour point an acuteness value representing an angle of contour curvature and generating a list of acuteness values for each traced contour;

dividing each acuteness list into contour groups, each contour group having a series of consecutive points that are either all convex or all concave in curvature; and extracting selected bending points from one or more contour groups using heuristically determined parameters in one or more iterations, said heuristically determined parameters including an acuteness parameter $A_n$, an edge parameter $E_N$ and a length parameter $L_N$, and wherein said $A_N$ parameter is used for excluding insignificant contour points by defining a minimum acuteness $A_N$ for bending point selection and wherein the $E_N$ and $L_N$ parameters are used to exclude insignificant contour groups by defining a minimum number $E_N$ of edge points that are to be excluded from each contour group and a minimum length $L_N$ for each contour group.

22. The method of claim 21 wherein the $A_N$, $E_N$ and $L_N$ parameters are heuristically selected to be either strong, medium or weak as required for each bending point extraction iteration.

23. The method of claim 21 wherein said step of extracting selected bending points is performed in four iterations including a first iteration wherein the $A_N$, $E_N$ and $L_N$ parameters are selected such that a bending point is initially extracted from each contour group having even weak curvature, a second iteration wherein the $A_N$, $F_n$ and $L_N$ parameters are selected such that a bending point is extracted from contour groups having strong curvature, a third iteration wherein the $A_n$, $E_N$ and $L_N$ parameters are selected such that a bending point is extracted from contour groups having long gentle curvatures, and a fourth iteration wherein the $A_N$, $E_N$ and $L_N$ parameters are selected such that a bending point is extracted from contour groups of medium curvature and length.

* * * * *